United States Patent
Luo et al.

(10) Patent No.: US 8,816,015 B2
(45) Date of Patent: Aug. 26, 2014

(54) LOW EMISSION POLYOXYMETHYLENE

(71) Applicant: Ticona LLC, Florence, KY (US)

(72) Inventors: Rong Luo, Florence, KY (US); Xinyu Zhao, Cincinnati, OH (US); Robert Gronner, Earlanger, KY (US); Nicolai Papke, Mainz-Kastel (DE)

(73) Assignee: Ticona, LLC, Florence, KY (US)

( * ) Notice: Subject to any disclaimer, the term of this patent is extended or adjusted under 35 U.S.C. 154(b) by 0 days.

(21) Appl. No.: 13/832,502

(22) Filed: Mar. 15, 2013

(65) Prior Publication Data

US 2013/0324675 A1 Dec. 5, 2013

Related U.S. Application Data

(60) Provisional application No. 61/655,685, filed on Jun. 5, 2012.

(51) Int. Cl.
| | | |
|---|---|---|
| *C08G 64/00* | (2006.01) | |
| *C08L 83/08* | (2006.01) | |
| *C08G 6/00* | (2006.01) | |
| C08G 63/02 | (2006.01) | |
| C08G 77/382 | (2006.01) | |

(52) U.S. Cl.
CPC . *C08G 6/00* (2013.01); *C08L 83/08* (2013.01); *C08G 77/382* (2013.01)
USPC ............ 525/398; 435/6.14; 435/287.2

(58) Field of Classification Search
USPC ............ 525/398; 435/6.14, 287.2
See application file for complete search history.

(56) References Cited

U.S. PATENT DOCUMENTS 6,753,406 B2    6/2004  Wulf et al.
7,816,479 B2 *  10/2010 Leaym et al. ............ 528/25

FOREIGN PATENT DOCUMENTS

| JP | 62-181305 | 8/1987 |
| JP | 09-235446 | 9/1997 |
| JP | 2000-230026 | 8/2000 |
| JP | 2007-051253 | 3/2007 |
| JP | 2009-132824 | 6/2009 |
| JP | 2010-144155 | 7/2010 |
| WO | WO 01/23473 | 4/2001 |

OTHER PUBLICATIONS

International Search Report and Written Opinion for PCT/US2013/403254 dated Jul. 17, 2013.

\* cited by examiner

*Primary Examiner* — Terressa Boykin
(74) *Attorney, Agent, or Firm* — Dority & Manning, P.A.

(57) ABSTRACT

Low VOC emission polyoxymethylene and compositions and products that incorporate the polyoxymethylene are described. The polyoxymethylene is end capped with compound that can prevent degradation of the polymer and subsequent emission of VOC degradation products such as formaldehyde. The end-capped polyoxymethylene can include an inorganic linkage within the polymer backbone that is the reaction product of a terminal hydroxyl group of the polyoxymethylene and a hydrolyzable group of the compound. Also disclosed are products as may be formed from the low VOC emission polyoxymethylene.

26 Claims, 6 Drawing Sheets

US 8,816,015 B2

LOW EMISSION POLYOXYMETHYLENE

CROSS REFERENCE TO RELATED APPLICATION

The present application claims filing benefit of U.S. Provisional Patent Application Ser. No. 61/655,685 having a filing date of Jun. 5, 2012, which is incorporated herein in its entirety.

BACKGROUND OF THE INVENTION

Oxymethylene polymers (also referred to as polyoxymethylenes and polyacetals) are a class of thermoplastics that have been found useful for a variety of applications including automotive construction, electrical applications, and medical technologies. Polyoxymethylenes have excellent properties including mechanical (e.g., strength) characteristics, permeability resistance, fatigue resistance, abrasion resistance, chemical resistance, and moldability.

Unfortunately, polyoxymethylenes tend to degrade when heated and are unstable, particularly in an oxidative, basic, or acidic environment. Moreover, as the polymers degrade they emit degradation products such as formaldehyde as volatile organic compounds (VOCs). Formaldehyde as well as other VOC emissions lead to an unpleasant odor and can raise environmental health concerns. The emission of VOCs and particularly the emission of formaldehyde by polyoxymethylenes both during processing and after the polymer has been molded into a desired shape have been problematic for the industry and has impaired the usefulness of these materials in many application sectors. For instance, the automotive industry has developed analysis methods (see, e.g., German Automotive Industry Recommendation No. 275, documented by Kraftfahrwesen e.V., July, 1994) for determining formaldehyde emission from polyoxymethylene components and strongly encourages the development of low emission polyoxymethylene polymers.

In an attempt to limit the VOC emissions of oxymethylene polymers, a variety of polymer stabilizers have been developed. For instance nitrogen-containing compounds such as dicyandiamide and amino-substituted triazine compounds have been utilized as polymer stabilizers. These stabilizers generally function as formaldehyde scavengers to bind formaldehyde and prevent emission. Unfortunately, such stabilizers do nothing to prevent the degradation of the polyoxymethylene polymers that leads to the formaldehyde emission in the first place. In addition, as stabilizers are not bound to the oxymethylene polymer, they have a tendency to migrate to the surface of the formed products and cause deposits and surface imperfections on the products.

What is needed in the art are polyoxymethylenes that are resistant to degradation, so as to provide polymers, polymer compositions, and products formed from the polymers that exhibit low VOC emission, have little or no mold deposits and improved surface characterization, present desirable strength and resistance characteristics, and are suitable for use in a variety of applications.

SUMMARY OF THE INVENTION

Disclosed are end-capped polyoxymethylenes that include an inorganic linkage to a non-hydrolyzable organic radical at the terminus of the end-capped polymer. Also disclosed are compositions and products including the end-capped polyoxymethylenes. The compositions can exhibit very low VOC emission. For instance, a polyoxymethylene composition including a low to mid-molecular weight end capped polyoxymethylene (e.g., having a melt flow index of greater than about 5 g/10 min) can have a formaldehyde emission of less than about 3 ppm as determined according to VDA-275. A composition including high molecular weight end capped polyoxymethylene (e.g., having a melt flow index of less than about 5 g/10 min) can have a formaldehyde emission level of less than about 7.75 ppm as determined according to VDA-275.

A composition including the end-capped polyoxymethylenes can beneficially be utilized in forming products such as, without limitation, automotive components such as fuel system components (e.g., fuel tanks, fuel sender unit, fuel caps, fuel pumps, etc.), lighting and signal components, window and door lock system components, and so forth; electrical components such as insulators, connectors, etc.; medical components such as inhalers and injection pens; sporting goods; and household appliances.

Also disclosed are methods for reducing the VOC emissions from a polyoxymethylene composition. For example, a method can include combining a polyoxymethylene with a compound, the compound comprising an inorganic atom, a hydrolyzable group and a nonhydrolyzable group. The hydrolyzable group can react with a terminal hydroxyl group of the polyoxymethylene to form an end-capped polyoxymethylene. The end-capped polyoxymethylene includes an inorganic linkage to a non-hydrolyzable organic radical at the terminus of the end-capped polymer that is formed upon reaction of terminal hydroxyl groups of the polyoxymethylene with the compound.

BRIEF DESCRIPTION OF THE FIGURES

The present disclosure may be better understood with reference to the following figures.

DETAILED DESCRIPTION

Figure 1:
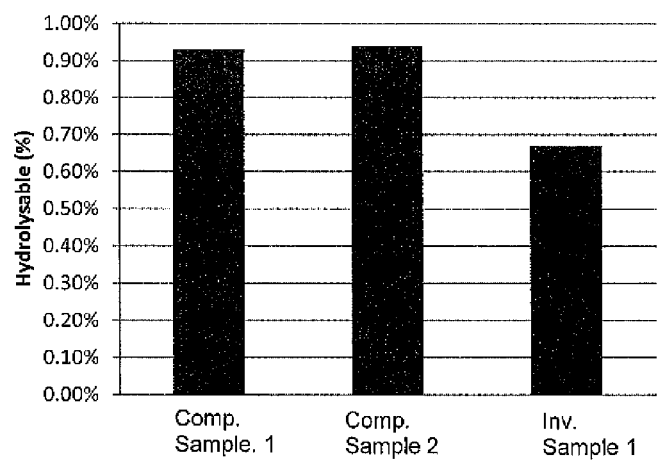
FIG. 1 illustrates a comparison of the hydrolyzable content of a composition including an end-capped polyoxymethylene as described herein, and two comparative compositions.

It is to be understood by one of ordinary skill in the art that the present discussion is a description of exemplary embodiments only, and is not intended as limiting the broader aspects of the present disclosure.

The present disclosure is generally directed to a low VOC emission polyoxymethylene and compositions and products that incorporate the polyoxymethylene. More specifically, the polyoxymethylene is end capped with a compound that includes an inorganic atom, a hydrolyzable group and a non-hydrolyzable group. Following capping of the polymer, the polymer can include an inorganic linkage to the non-hydrolyzable group at the polymer terminus following the reaction of a terminal hydroxyl group of the polyoxymethylene and the hydrolyzable group of the compound. The end capping group on the terminus of the polyoxymethylene can prevent degradation of the polymer and subsequent emission of VOC degradation products such as formaldehyde.

Any polyoxymethylene, i.e., either copolymers or homopolymers, can be end capped so as to form the low-emission polyoxymethylene. Beneficially, the polyoxymethylene can be formed to exhibit particular qualities, such as a particular melt flow index, mechanical characteristics, thermal characteristics, etc. according to standard practice, and the addition of the end cap to the polymer can lower the VOC emission characteristics with little or no effect on the other characteristics of the polymer. For instance, the melt flow index, tensile strength characteristics, modulus characteristics, etc., will be retained following end capping of the polymer, which can simplify formation processes.

The addition of the end capping group to the polyoxymethylene can decrease the VOC emission as compared to a non-capped polymer. For instance, a composition including a low to mid-molecular weight end capped polyoxymethylene polymer having a melt flow index of greater than about 5 grams per 10 minutes (g/10 min) as determined according to ISO Test Method No. 1133 at 190° C. and 2.16 kg, can have a formaldehyde emission level of less than about 3 ppm, less than about 1.60 ppm, less than about 1.5 ppm, less than about 1.0 ppm, or less than about 0.5 ppm as determined according to VDA-275. When considering a composition including a high molecular weight polyoxymethylene, for instance having a melt flow index of less than about 5 g/10 min as determined according to ISO 1133 at 190° C. and 2.16 kg, the composition can have a formaldehyde emission level of less than about 7.5 ppm, less than about 6.0 ppm, or less than about 5.5 ppm, as determined according to VDA-275.

The end capped polyoxymethylenes can also exhibit a low hydrolyzable content, which is a measure of the terminal hydroxyl-containing groups such as terminal hemiacetals that can be degraded to form VOCs. For instance, low to mid molecular weight end capped polyoxymethylene having a melt flow index of greater than about 5 grams per 10 minutes (g/10 min) as determined according to ISO Test Method No. 1133 at 190° C. and 2.16 kg, having a relatively low comonomer content (e.g., less than about 1%, or less than about 0.1% by weight of monomer units having two or more adjacent carbon atoms) can have a hydrolyzable content of less than about 0.9 wt. %, less than about 0.8 wt. %, or less than about 0.7 wt. % as determined by a sulfite titration method. A low to mid-molecular weight end capped polyoxymethylene having a relatively high comonomer content (e.g., greater than about 1% by weight of monomer units having two or more adjacent carbon atoms) can have a hydrolyzable content of less than about 0.23 wt. %, less than about 0.22 wt. %, or less than about 0.21%. For instance, a low to mid-molecular weight end capped polyoxymethylene can have a hydrolyzable content of less than about 3 mmol/kg, or less than about 2.5 mmol/kg.

A high molecular weight end capped polyoxymethylene having a melt flow index of less than about 5 grams per 10 minutes (g/10 min) as determined according to ISO Test Method No. 1133 at 190° C. and 2.16 kg can have a hydrolyzable content of less than about 5 wt. %, less than about 4 wt. %, or less than about 3 wt. % as determined by a sulfite titration method. In one embodiment, a high molecular weight end capped polyoxymethylene can have a hydrolyzable content of less than about 5 mmol/kg, or less than about 3 mmol/kg.

Moreover, as a composition including the end capped polyoxymethylene can incorporate little or no traditional stabilizing agents, a product that incorporates the composition can exhibit decreased mold deposit and surface imperfections due to migration of a stabilizing agent.

In addition to the above, the end capping of the polyoxymethylene by use of the compound can prevent discoloration of the polymer composition. While not wishing to be bound to any particular theory, it is believed that the prevention of polymer degradation due to the presence of the terminal cap and the related prevention of degradation products within the composition can prevent discoloration. The variation in discoloration between a composition including the end capped polyoxymethylene and a similar polyoxymethylene that is not end capped can be quantified by measuring absorbance with an optical reader in accordance with a standard test methodology known as "CIELAB", which is described in Pocket Guide to Digital Printing by F. Cost, Delmar Publishers, Albany, N.Y. ISBN 0-8273-7592-1 at pages 144 and 145 and "Photoelectric color difference meter", Journal of Optical Society of America, volume 48, page numbers 985-995, S. Hunter, (1958), both of which are incorporated herein by reference in their entirety.

The CIELAB test method defines three "Hunter" scale values, L*, a*, and b*, which correspond to three characteristics of a perceived color based on the opponent theory of color perception and are defined as follows:

L=Lightness (or luminosity), ranging from 0 to 100, where 0=dark and 100=light;

a=Red/green axis, ranging from −100 to 100; positive values are reddish and negative values are greenish; and b=Yellow/blue axis, ranging from −100 to 100; positive values are yellowish and negative values are bluish.

Color measurement can be performed using a DataColor 650 Spectrophotometer utilizing an integrating sphere with measurements made using the specular included mode. Color coordinates can likewise be calculated according to ASTM D2244-11 under an illuminant D65/10°, A/10°, or F2/10° observer, using CIELAB units. For example, the polymer composition can exhibit an 'L' value between about 85 and about 95, for instance between about 87 and about 94; an 'a' value between about −0.7 and about 0.5, for instance between about −0.6 and about 0.3; and a 'b' value between about −0.5 and about 2, for instance between about −0.3 and about 1.7.

The polymer composition can also exhibit a relatively low yellowness index, which is another format for determining the lack of discoloration of the polymer composition. For example, the polymer composition can exhibit a Gardner Yellowness Index as determined according to ASTM E313.

For example, the polymer composition can exhibit a Gardner Yellowness Index at 185° C. of less than about −6, or less than about −5. At higher temperatures, the Gardner Yellowness index can increase somewhat, but still present good color characteristics. For instance, at 205° C., the polymer composition can exhibit a Gardner Yellowness Index of less than zero, for instance less than about −1, less than about −2, or less than about −3. At 220° C., the polymer composition can exhibit a Gardner Yellowness Index of less than about 2, less than about 1, or less than about −1, in one embodiment.

The polyoxymethylene can be either an oxymethylene homopolymer or copolymer and is not limited as to any particular monomeric components or relative amounts of monomeric components. For instance, the polyoxymethylene can be a conventional oxymethylene homopolymer and/or oxymethylene copolymer. Conventional polyoxymethylenes are generally unbranched linear polymers that contain greater than about 80%, or greater than about 90%, oxymethylene units (—CH$_2$O—). The polyoxymethylene is not limited to this level of oxymethylene units, however, and polymers including lower content of oxymethylene units are also encompassed herein. According to one embodiment, the polyoxymethylene can be a homo- or copolymer which comprises greater than about 50 mol %, greater than about 75 mol %, greater than about 90 mol %, or greater than about 95 mol % —CH$_2$O— repeat units.

Polyoxymethylenes encompass both homopolymers of formaldehyde or its cyclic oligomers, such as trioxane or 1,3,5,7-tetraoxacyclooctane, and corresponding copolymers. By way of example, the following components can be used in any suitable proportional relationship in the polymerization process: ethyleneoxide, 1,2-propyleneoxide, 1,2-butyleneoxide, 1,3-butyleneoxide, 1,3-dioxane, 1,3-dioxolane, 1,3-dioxepane and 1,3,6-trioxocane as cyclic ethers as well as linear oligo- or polyformals, like polydioxolane or polydioxepane. Further, conventional functionalized polyoxymethylenes that are prepared by copolymerization of trioxane and the formal of trimethylolpropane (ester), of trioxane and the α,α- and the α,β-isomers of glyceryl formal (ester) or of trioxane and the formal of 1,2,6-hexantriol (ester) can be used as the polyoxymethylene. An oxymethylene copolymer can generally include greater than about 0.1% by weight of monomer units of the copolymer having at least two adjacent carbon atoms. By way of example, an oxymethylene copolymer can include from about 1% to about 10% by weight of monomer units having two or more adjacent carbon atoms. Such conventional oxymethylene homo- or copolymers are known to the person skilled in the art and are described in the literature.

In one embodiment, an oxymethylene copolymer can include up to about 50 mol %, for instance from about 0.1 mol % to about 20 mol %, or from about 0.3 mol % to about 10 mol %, of repeat units having the following structure:

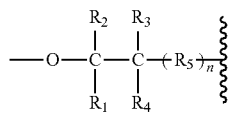

wherein

R$_1$ to R$_4$, independently of one another, are hydrogen, alkyl, or halogen-substituted alkyl having from 1 to 4 carbon atoms, R$_5$ is —CH$_2$—, —CH$_2$O—, C1-C4-alkyl- or C1-C4-haloalkyl-substituted methylene, or a corresponding oxymethylene group, and n is from 0 to 3.

These groups may be introduced into the copolymers by the ring-opening of cyclic ethers. Cyclic ethers can include those of the formula:

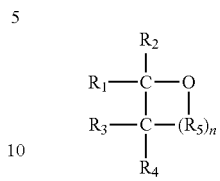

where R$^1$ to R$^5$ and n are as defined above.

Cyclic ethers which may be mentioned as examples are ethylene oxide, propylene 1,2-oxide, butylene 1,2-oxide, butylene 1,3-oxide, 1,3-dioxane, 1,3-dioxolane, and 1,3-dioxepan, and comonomers which may be mentioned as examples are linear oligo- or polyformals, such as polydioxolane or polydioxepane.

Use can also be made of oxymethylene terpolymers, for example those prepared by reacting trioxane with one of the abovementioned cyclic ethers and with a third monomer, for instance a bifunctional compound of the formula

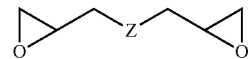

where

Z is a chemical bond, —O— or —ORO—(R═C1-C8-alkylene or C2-C8-cycloalkylene).

Monomers of this type can include, without limitation, ethylene diglycide, diglycidyl ether, and diethers composed of glycidyl units and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexene dial, to mention just a few examples.

The polyoxymethylene polymer can have a high content of terminal hydroxyl groups including, for example, hydroxyethylene groups (—OCH$_2$CH$_2$OH) and hemi-acetal groups (—OCH$_2$OH). In one embodiment, the terminal hydroxyl groups can be primarily terminal hydroxyethylene groups. The polyoxymethylene can have, for instance, greater than about 50%, greater than about 70%, greater than about 75%, greater than about 85%, or greater than about 90% terminal hydroxyl groups. In one embodiment, the polyoxymethylene can have a content of terminal hydroxyl groups of greater than about 5 mmol/kg, greater than about 10 mmol/kg, or greater than about 15 mmol/kg, for example ranging from about 18 to about 40 mmol/kg, or from about 20 to about 30 mmol/kg. As utilized herein, the term "terminal hydroxyl groups" refers to terminal groups at any point of the polymer, including terminal side groups of the main polymer backbone. The content of terminal hydroxyl groups can be determined according to known practice, for instance as described in K. Kawaguchi, E. Masuda, Y. Tajima, Journal of Applied Polymer Science, Vol. 107, 667-673 (2008).

In addition to terminal hydroxyl groups, the polyoxymethylene may also have other terminal groups usual for these polymers. Examples of these are alkoxy groups, formate groups, acetate groups and aldehyde groups.

The polyoxymethylene can be a low, mid- or high molecular weight polyoxymethylene. In one embodiment, the polyoxymethylene can have a melt flow index (MFI) ranging from about 1 to about 30 g/10 min, as determined according to ISO 1133 at 190° C. and 2.16 kg, though polyoxymethylenes having a higher or lower melt flow index are also encompassed herein. For example, the polyoxymethylene polymer may be a low or mid-molecular weight polyoxymethylene that has a melt flow index of greater than about 5 g/10 min, greater than about 10 g/10 min, or greater than about 15 g/10 min. The melt flow index of the polyoxymethylene polymer can be less than about 25 g/10 min, less than about 20 g/10 min, less than about 18 g/10 min, less than about 15 g/10 min, less than about 13 g/10 min, or less than about 12 g/10 min. The polyoxymethylene polymer may for instance be a high molecular weight polyoxymethylene that has a melt flow index of less than about 5 g/10 min, less than about 3 g/10 min, or less than about 2 g/10 min.

The polyoxymethylene can have constituents of various molecular weights. In one embodiment, the polyoxymethylene can have little or no low molecular weight constituents. For instance, the polyoxymethylene can have low molecular weight constituents (e.g., constituents having molecular weights below about 10,000 Dalton) of less than about 15% by weight, less than about 10% by weight, less than about 5% by weight, less than about 3% by weight, or less than about 2% by weight, based on the total weight of the polyoxymethylene.

The preparation of the polyoxymethylene can be carried out by polymerization of polyoxymethylene-forming monomers, such as trioxane or a mixture of trioxane and dioxolane and/or butanediol formal in the presence of a molecular weight regulator such as ethylene glycol or methylal. The polymerization can be effected as precipitation polymerization or in the melt. Initiators which may be used are the compounds known per se, including either anionic or cationic initiators such as trifluoromethane sulfonic acid; these can be added as solution in ethylene glycol to the monomer. By way of example, a polyoxymethylene homopolymers can be formed via anionic polymerization according to known methods. The procedure and termination of the polymerization and working-up of the product obtained can be carried out according to known processes. By a suitable choice of the polymerization parameters, such as duration of polymerization and/or amount of molecular weight regulator, the molecular weight and hence the melt flow index value of the resulting polymer can be adjusted. The criteria for choice in this respect are known to the person skilled in the art. The above-described procedure for the polymerization leads as a rule to polymers having comparatively small proportions of low molecular weight constituents. If a further reduction in the content of low molecular weight constituents were to be desired or required, this can be affected by separating off the low molecular weight fractions of the polymer after the deactivation and the degradation of the unstable fractions after treatment with a basic protic solvent. This may be a fractional precipitation from a solution of the stabilized polymer, polymer fractions of different molecular weight distribution being obtained.

In one embodiment, a polyoxymethylene with hydroxyl terminal groups can be produced using a cationic polymerization process, optionally followed by solution hydrolysis to remove any unstable end groups. Cationic initiators as are generally known in the art can be utilized such as Lewis acids, and in one particular embodiment, boron trifluoride. In one embodiment, however, the solution hydrolysis process need not be carried out, as the end capping of the polyoxymethylene with the compound can stabilize the as-formed polymer. During cationic polymerization, a glycol, such as ethylene glycol can be used as a chain terminating agent. The cationic polymerization results in a bimodal molecular weight distribution containing low molecular weight constituents.

According to one formation process, the polyoxymethylene forming monomers can be polymerized in the presence of one or more heteropolyacids. It has been discovered that the low molecular weight constituents can be significantly reduced by conducting the polymerization using a heteropolyacid such as phosphotungstic acid as the catalyst. When using a heteropolyacid as the catalyst, for instance, the amount of low molecular weight constituents can be less than 2% by weight.

The term "heteropolyacid" is a generic term for a polyacid formed by the condensation of different kinds of oxo acids through dehydration. A heteropolyacid contains a mono- or poly-nuclear complex ion wherein a hetero element is present in the center and the oxo acid residues are condensed through oxygen atoms. Such a heteropolyacid is represented by the formula:

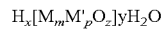

wherein

M represents an element selected from the group consisting of P, Si, Ge, Sn, As, Sb, U, Mn, Re, Cu, Ni, Ti, Co, Fe, Cr, Th and Ce, M' represents an element selected from the group consisting of W, Mo, V and Nb, m is 1 to 10, p is 6 to 40, z is 10 to 100, x is an integer of 1 or above, and y is 0 to 50.

The central element (M) in the formula described above may be composed of one or more kinds of elements selected from P and Si and the coordinate element (M') is composed of at least one element selected from W, Mo and V.

Specific examples of heteropolyacids include those selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

The heteropolyacid may be dissolved in an alkyl ester of a polybasic carboxylic acid. It has been found that alkyl esters of polybasic carboxylic acid are effective to dissolve the heteropolyacids or salts thereof at room temperature (25° C.).

Examples of the alkyl ester of a polybasic carboxylic acid can include, but are not limited to, dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

The polyoxymethylene can be end capped with a compound having the general structure of

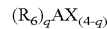

wherein

A is an inorganic atom;

q is 1 to 3;

X is a hydrolyzable group such as an alkoxy group (e.g., a C1-C10 alkoxy group), an acyloxy group (e.g., a C1-C10 acyloxy group), a halogen, etc., and wherein multiple X groups can be the same or different as one another, at least one of which is an alkoxy group; and $R_6$ is a nonhydrolyzable organic radical.

For example, $R_6$ can have the general structure of

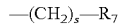

wherein s is 1 to 3; and $R_7$ is alkyl (e.g., C1-C10 alkyl), amine, epoxy, mercapto, vinyl, styryl, aromatic, phosphine, methacrylate, ureido, polyethylene glycol, organosilane, etc., any of which can include functional groups, such as halogenated (e.g., fluorinated) functional groups, and can be branched or straight chained.

By way of example, the end capping compound can be a silane compound having the general structure of:

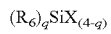

Wherein X, q, and $R_6$ are as described above.

In one embodiment, the end capping compound can be a dipodal or tripodal silane compound having the general structure of:

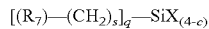

wherein X, s and q are as described above and $R_7$ is an organosilane compound having the general structure of

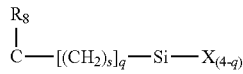

wherein s, q, and X are as defined above and $R_8$ is alkyl (e.g., C1-C10 alkyl), amine, epoxy, mercapto, vinyl, styryl, aromatic, phosphine, methacrylate, ureido, polyethylene glycol, organosilane, etc., any of which can include functional groups, such as halogenated (e.g., fluorinated) functional groups, and can be branched or straight chained.

In one embodiment, the nonhydroloyzable organic radical $R_6$ of the compound can be a non-reactive radical with no reactive functionality available on the radical for additional reaction between the capping agent and other components of the polyoxymethylene composition. For example, nonhydrolyzable organic radical can be an alkyl radical. By way of example, the compound can be an alkoxy silane compound including, without limitation, a monoalkoxy silane or a dialkoxysilane that includes a C1-C10 alkyl $R_7$ group.

In another embodiment, the nonhydrolyzable organic radical can include reactive functionality such as halogen, vinyl, epoxy, amino, silane or mercapto functionality, or combinations of functionality. By way of example, the compound can be a silane compound such as, but not limited to, chlorosilanes, vinlyalkoxysilanes, epoxyalkoxysilanes, aminoalkoxysilanes, mercaptoalkoxysilanes, and combinations thereof. Examples of the vinylalkoxysilane that may be utilized include vinyltriethoxysilane, vinyltrimethoxysilane and vinyltris(β-methoxyethoxy)silane. Examples of the epoxyalkoxysilanes that may be used include γ-glycidoxypropyltrimethoxysilane, β-(3,4-epoxycyclohexyl)ethyltrimethoxysilane and γ-glycidoxypropyltriethoxysilane. Examples of the mercaptoalkoxysilanes that may be employed include γ-mercaptopropyltrimethoxysilane and γ-mercaptopropyltriethoxysilane.

Amino silane compounds may be of the formula: $R_9$—Si—$(R_{1D})_3$, wherein $R_9$ is selected from the group consisting of an amino group such as $NH_2$; an aminoalkyl of from about 1 to about 10 carbon atoms, or from about 2 to about 5 carbon atoms, such as aminomethyl, aminoethyl, aminopropyl, aminobutyl, and so forth; an alkene of from about 2 to about 10 carbon atoms, or from about 2 to about 5 carbon atoms, such as ethylene, propylene, butylene, and so forth; and an alkyne of from about 2 to about 10 carbon atoms, or from about 2 to about 5 carbon atoms, such as ethyne, propyne, butyne and so forth; and wherein $R_{10}$ is an alkoxy group of from about 1 to about 10 atoms, or from about 2 to about 5 carbon atoms, such as methoxy, ethoxy, propoxy, and so forth.

The compound can generally be provided in a stoichiometric excess, which can vary depending upon the specific structure of the polyoxymethylene, e.g., depending upon the content of terminal hydroxyl groups and/or hemiacetal end groups of the polymer. In general, the compound can be provided in an amount of less than about 5 wt. % by weight of the polyoxymethylene polymer, less than about 1 wt. %, or less than about 0.5 wt. %. For example, the compound can be provided in an amount of between about 0.05 wt. % and about 5 wt. %, or between about 0.1 wt. % and about 1 wt. %.

The end capped polyoxymethylene can be prepared by combination of the polyoxymethylene and the compound under appropriate conditions so as to encourage the formation of a covalent bond between a terminal hydroxyl group end group of the polyoxymethylene and the compound. A terminal hydroxyl group can be, for example, a portion of a terminal hemiacetal group or a portion of a terminal hydroxyalkylene group. In general, the polyoxymethylene and the compound can be combined in the melt. The reaction of the components in a reactive processing step is typically effected at temperatures of from about 100° C. to about 260° C., or from about 150° C. to about 220° C., and the duration of reaction is typically from about 0.2 minutes to about 60 minutes.

A representative reaction scheme for a polyoxymethylene with a trimethoxy silane compound the is as follows:

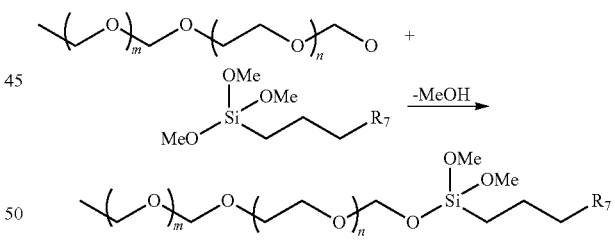

As can be seen, following the reaction, the polymer includes an inorganic linkage group, in this case a siloxane linking group in the backbone of the polymer that links the oxymethylene backbone to the end capping group. This can prevent degradation of the polymer as well as provide chain extension to the polyoxymethylene and optionally the addition of a desired reactive functionality to the terminal ends of the polymer.

A polyoxymethylene composition that incorporates the end capped polyoxymethylene can include additional additives as are generally known in the art. For example, in order to further reduce formaldehyde emissions from the polymeric composition, the composition can contain a formaldehyde scavenger as is known in the art, such as a nitrogen containing compound. The addition of a formaldehyde scavenger to a composition include the end-capped polyoxymethylene can further reduce the VOC emission level of the composition. For example, a composition including a high molecular weight polyoxymethylene (e.g., having a melt flow index of less than about 5 g/10 min as determined according to ISO 1133 at 190° C. and 2.16 kg, the polyoxymethylene composition can have a formaldehyde emission Level of less than about 3.0 ppm, less than about 2.6 ppm, or less than about 1.5 ppm, as determined according to VDA-275.

The total amount of any formaldehyde scavenger present in the composition is relatively small. For instance, the formaldehyde scavenger can be present in an amount less than about 0.5 percent by weight, such as from about 0.01 percent to about 0.5 percent by weight, such as from about 0.02 percent to about 0.1 percent by weight (which excludes other nitrogen containing compounds that may be present in the composition that are not considered formaldehyde scavengers such as waxes or hindered amines). Any suitable formaldehyde scavenger can be included into the composition including, for example, aminotriazine compounds, allantoin, hydrazides, polyamides, melamines, or mixtures thereof. In one embodiment, the formaldehyde scavenger may comprise a heterocyclic compound having at least one nitrogen atom adjacent to an amino substituted carbon atom or a carbonyl group. In one specific embodiment, for instance, the formaldehyde scavenger may comprise benzoguanamine. In still other embodiments, the formaldehyde scavenger may comprise a melamine modified phenol, a polyphenol, an amino acid, a nitrogen containing phosphorus compound, an acetoacetamide compound, a pyrazole compound, a triazole compound, a hemiacetal compound, other guanamines, a hydantoin, a urea including urea derivatives, and the like, as well as combinations of scavengers.

The polymeric composition can include an acid scavenger that can prevent acid catalyzed hydrolytic decomposition of the polyoxymethylene. The inclusion of an acid scavenger may be of particular benefit at high temperature/high humidity processing conditions. By way of example, an acid scavenger can include, without limitation, hydroxides, inorganic acid salts, phosphates, hydrogen phosphates, and carboxylic acid salts of alkali metals and alkaline earth metals. Examples can include calcium hydroxide; magnesium hydroxide; barium hydroxide; lithium, sodium, calcium, or aluminum (hydroxyl)carbonates such as calcium carbonate, magnesium carbonate, barium carbonate, calcium silicate, magnesium silicate, calcium laurate, magnesium laurate, calcium stearate, magnesium stearate, zinc stearate, calcium behenate, magnesium behenate, calcium lactate, calcium stearoyl lactylate, zinc oxide, natural and synthetic hydrotalcites, sodium phosphate, sodium hydrogen phosphate, and the like. In one embodiment, the acid scavenger can be a hydroxystearate salt, for instance calcium, magnesium, or zinc hydroxystearate. Acid scavengers may be used alone or in combination of two or more when forming the polymeric composition and this is not critical.

An acid scavenger can generally be included in a polymeric composition in an amount of from about 0.01 wt. % to about 10 wt. %, or from about 0.02 wt. % to about 5 wt. %, based on the total weight of the polymeric composition.

The inclusion of an acid scavenger may be particularly useful in those embodiments in which the polymeric composition is processed at high temperatures, for instance greater than about 200° C., as the addition of the acid scavenger can improve the thermal stability of the system.

In addition to the above components, the polymeric composition may contain various other additives and ingredients. For instance, the composition may contain colorants, light stabilizers, antioxidants, processing aids, gloss agents, and fillers. For example, in one embodiment the polymeric composition can include calcium carbonate, which can improve the color characteristics of the composition.

Colorants that may be used include any desired inorganic pigments, such as titanium dioxide, ultramarine blue, cobalt blue, and other organic pigments and dyes, such as phthalocyanines, anthraquinones, and the like. Other colorants include carbon black or various other polymer-soluble dyes. The colorants can generally be present in the composition in an amount up to about 2 percent by weight.

Other additives that may be included in the composition include an ester of a polyhydric alcohol and at least one fatty acid. The fatty acid can have from about 10 to about 32 carbon atoms, while the polyhydric alcohol can have from about 2 to about 8 carbon atoms. Such alcohols include ethylene glycol, glycerol, butylene glycol, and pentaerythritol. Fatty acids that may be used include montanic acids.

Another possible additive is a metal salt of a short-chain carboxylic acid. The metal used to construct the metal salt, for instance, may comprise an alkali metal or an alkaline earth metal. The carboxylic acid may possess from about 3 to about 8 carbon atoms.

Still another additive that may be present in the composition is a sterically hindered phenol compound. Examples of such compounds, which are available commercially, are pentaerythrityl tetrakis[3-(3,5-di-tert-butyl-4-hydroxyphenyl) propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-cert-butyl-4-hydroxyphenyl)propionate] (Irganox 259, BASF), and 3,5-di-tert-butyl-4-hydroxytoluene (Lowinox BHT, Chemtura). Preference is given to Irganox 1010 and especially Irganox 245.

Light stabilizers that may be present in the composition include sterically hindered amines. Such compounds include 2,2,6,6-tetramethyl-4-piperidyl compounds, e.g., bis(2,2,6,6-tetramethyl-4-piperidyl) sebacate (Tinuvin 770, BASF) or the polymer of dimethyl succinate and 1-(2-hydroxyethyl)-4-hydroxy-2,2,6,6-tetramethyl-4-piperidine (Tinuvin 622, BASF). UV stabilizers or absorbers that may be present in the composition include benzophenones or benzotriazoles.

If desired, the polyoxymethylene composition may also be combined with a filler material to form a filled composition and to enhance strength. A filled composition can include, for example, a mineral filler and/or a fiber filler optionally in conjunction with one or more other additives as are generally known in the art.

The polyoxymethylene composition may be an unfilled composition. In another embodiment, however, the composition may include a filler material. For example, fibers may be employed as a filler material to improve the mechanical properties of the composition. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. Fibers may be formed from materials that are also generally insulative in nature, such as glass, ceramics (e.g., alumina or silica), aramids (e.g., Kevlar® marketed by E. I. duPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof.

Mineral fillers may be employed as a filler material to improve mechanical properties. Mineral fillers may, for instance, be employed in the filled polymer composition to help achieve the desired mechanical properties and/or appearance. When employed, mineral fillers typically constitute from about 5 wt. % to about 60 wt. %, in some embodiments from about 10 wt. % to about 55 wt. %, and in some embodiments, from about 20 wt. % to about 50 wt. % of the polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($(MgFe,Al)_3(Al,Si)_4O_{10}(OH)_2 \cdot 4H_2O$), palygorskite (($Mg,Al)_2Si_4O_{10}(OH) \cdot 4(H_2O)$)), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

The processing of the composition can be effected by mixing the components and subsequent thermoplastic processing or by mixing the components in heatable mixing units suitable for this purpose. Suitable mixing units and mixing processes are described, for example, in: Saechtling, Kunststoff-Taschenbuch [Plastics Handbook], Hanser Verlag, 27th edition 1998, on pages 202 to 217.

In one embodiment, the components of the polymeric composition can be reacted together and compounded prior to being used in a further molding process for formation of a product. For instance, in one embodiment, the different components can be melted and mixed together in a conventional single or twin screw extruder at a temperature described above. Extruded strands may be produced by the extruder and then pelletized. Prior to compounding, the polymer components may be dried to a moisture content of about 0.05 weight percent or less. If desired, the pelletized compound can be ground to any suitable particle size, such as in the range of from about 100 microns to about 500 microns.

Shaping processes for forming articles of the polyoxymethylene composition can include, without limitation, extrusion, injection molding, blow-molding, compression molding, hot-stamping, pultrusion, and so forth. Shaped articles that may be formed may include structural and non-structural shaped parts. For instance, automotive components such as fuel tanks, and fuel caps, fuel filler necks, fuel sender unit components (e.g. flanges or swirl pot), fuel pumps, fuel rails, turn signal and light shifters, power window components, door lock system components, and so forth can be formed from the polyoxymethylene composition.

By way of example, in one embodiment, the polyoxymethylene composition can be utilized to form a container such as a fuel tank according to a blow molding process. In general, the blow molding process begins with melting the molding composition and forming it into a parison. Single screw extruders with the appropriate screw design are used to convert the composition (usually pellets) into a homogeneous melt. Depending on the melt strength one can use the composition with the regular classic extrusion blow molding process. This applies for the composition with a maximum parison length of 250 to 300 mm. For larger parison length it might be necessary to use the extrusion blow molding process with an additional accumulator head. The size of the head depends on the amount of material to form a specific container size and wall thickness.

The basic process has two fundamental phases. Initially, the parison itself (parison means tube-like piece of plastic) is extruded vertically out of the die. Once the parison settles on the injector pin (air injector), the mold is closed. In the second phase air is injected into the tube and pressure increased until it reaches the wall of the tool.

The pressure is generally held until the melt solidifies. A desirable factor for this process is to achieve components with a homogenous wall thickness distribution throughout the whole component/parison length. This can be achieved with a wall thickness control feature (WDS) at the die head. In general this feature means that a programming step is incorporated into the process to establish an extrusion/wall thickness profile while the parison is ejected from the accumulator head.

Of course, any other formation process as is known in the art can alternatively be utilized in forming the polyoxymethylene composition. For example, the polyoxymethylene composition can be shaped according to a rotomolding process to form a hollow product. Processing by rotomolding typically takes place at oven temperatures of from about 100° C. to about 300° C., or from about 200° C. to about 270° C., and the processing time is typically from about 1 minute to about 60 minutes, or from about 20 minutes to about 30 minutes.

Furthermore, hollow products formed of the polyoxymethylene composition can include walls that are composed of layers of different materials, e.g. an external layer composed of polyethylene and an internal layer composed of the polyoxymethylene. The polyoxymethylene composition moreover is effective in flowing around inserts introduced into the rotomolding mold during the rotomolding process and integrating them into the hollow product.

The polyoxymethylene composition can be shaped according to an injection molding process to form products that can have a relatively intricate or complicated shape. For example, products that can be formed from the polyoxymethylene composition that may be formed according to an injection molding process can include components such as, without limitation, mechanical gears, sliding and guiding elements, housing parts, springs, chains, screws, nuts, fan wheels, pump parts, valve bodies, hardware such as locks, handles, and hinges, zippers, and so forth.

An injection molding process can generally include heating the polyoxymethylene molding composition in a preheating zone to a plastic melt, and thereafter forcing the composition through a nozzle into a closed mold. Heating of the polyoxymethylene is typically to a temperature of from about 180° C. to about 240° C. The temperature of the mold is generally substantially lower, e.g., about 100° C. lower, although the exact relationship between the melt temperature and the mold temperature is dependent on factors such as the desired surface characteristics of the shaped article as will be appreciated by the skilled artisan. The injection molding may be carried out in conventional injection-molding apparatus having, for example, a preheating cylinder, plunger, or reciprocating screw, torpedo, nozzle and mold including a sprue, runners, gates and mold cavities. Cylinder temperatures are usually between about 180° C. and about 240° C. and molding pressures are usually between about 5,000 and 20,000 psi.

Actual molding temperatures and pressures will vary depending on the type of machine as is known, e.g., employment of a plunger injection molding machine or a screw injection molding machine or on the desired shape and size of the molded article. Cycle times are usually between about 30 and about 110 seconds.

The polyoxymethylene composition can also be utilized in electrical applications, for instance in forming insulators, bobbins, connectors, and parts for electronic devices such as televisions, telephones, etc. Medical devices such as injection pens and metered dose inhalers can be formed of the polyoxymethylene composition as well as a variety of sporting goods equipment (e.g., paintball accessories and airsoft guns) and household appliances (e.g., coffee makers and knife handles). The polyoxymethylene composition can also be utilized in forming automotive components such as, without limitation, fuel system components (e.g., fuel tanks, fuel sender units, fuel caps, fuel pumps, etc.), lighting and signal components, and window and door lock components.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Test Methods

Tensile bar formation: A roboshot 110 SiB molding machine was used to produce tensile bars. Tensile bars are injection molded to ISO 527-1 specifications according to standard ISO conditions. Temperatures are 177° C., 182° C., 188° C. and 193° C. (rear to nozzle) with a mold temperature of 80° C. and an injection speed of 200 mm/s.

Melt Flow Index: Melt flow index was determined according to ISO 1133 at 190° C. and 2.16 kg load.

Formaldehyde Emission: Plaques of wall thickness 1 mm were injection molded. After storage for 24 h, formaldehyde emission was determined according to VDA-275 (German Automotive Industry Recommendation No. 275, documented by Kraftfahrwesen e.V., July, 1994) (3 hours at 60° C., bottle method). The melt temperature measured at the die was varied in certain examples as provided in the results.

Tensile Modulus, Tensile Stress, and Tensile Elongation: Tensile properties were tested according to ISO Test No. 527 (technically equivalent to ASTM D638). Modulus and strength measurements were made on the same test strip sample having a length of 80 mm, thickness of 10 mm, and width of 4 mm. Testing temperature was 23° C., and testing speed was 50 mm/min.

Flexural Modulus, Flexural Stress, and Flexural Strain: Flexural properties were tested according to ISO Test No. 178 (technically equivalent to ASTM D790). This test was performed on a 64 mm support span. Tests were run on the center portions of uncut ISO 3167 multi-purpose bars. Testing temperature was 23° C., and testing speed was 2 mm/min.

Notched Charpy Impact Strength: Notched Charpy properties are tested according to ISO Test No. ISO 179-1 (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C.

Deflection Under Load Temperature ("DTUL"): The deflection under load temperature was determined in accordance with ISO Test No. 75-2 (technically equivalent to ASTM D648-07). A test strip sample having a length of 80 mm, thickness of 10 mm, and width of 4 mm was subjected to an edgewise three-point bending test in which the specified load (maximum outer fibers stress) was 1.8 MPa. The specimen was lowered into a silicone oil bath where the temperature is raised at 2° C. per minute until it deflects 0.25 mm (0.32 mm for ISO Test No. 75-2).

Color Characteristics: The Hunter scale values, L, a, and b, were determined according to CIELAB testing methods.

Yellowness Index: The ASTM Yellowness Index for Examples 1-6 was determined according to ASTM E313, "Standard Practice for Calculating Yellowness and Whiteness Indices from Instrumentally Measured Color Coordinates,"

The DIN Yellowness Index for Examples 7-8 was determined by use of a BYK Gardner Color Sphere spectrophotometer according to DIN 6167 with standard light D 65 and an observation angle of 10°.

Percent of Hydrolyzable Groups: A sample was pre-dried and then hydrolyzed in aqueous triethylamine at 188° C. (under pressure) for 20 min. The liberated formaldehyde is determined by the sulfite titration method. This method is used to measure wt. % hydrolysable portion of polyoxymethylene polymer.

Nuclear Magnetic Resonance (NMR): The sample is added to 0.5 mL Hexafluoro-isopropanol(HFlP)-$d_2$ solvent. The $^1$H NMR spectrum for the sample was collected on a Bruker Advance III 400 MHz spectrometer (37° C.) using 5 mm DUL probe.

Materials (Examples 1-6)

Silane Compounds:
(3-aminopropyl)triethoxy silane (ATEO) was utilized as an amino functional silane compound.
(3-mercaptopropyl)trimethoxy silane (MTMO) was utilized as a mercapto functional silane compound.
Octyl triethoxysilane (OTEO) was utilized as an alkyl silane compound.
Lubricant: N,N'-ethylene bis-stearamide wax.
Antioxidant: triethyleneglycol-bis[3-(3-t-butyl-4-hydroxy-5-methyphenyl)propionate
Formaldehyde Scavengers:
a. Benzoguanamine (2,4-Diamino-6-phenyl-1,3,5-triazine).
b. copolyamide
c. 5-ureidohydantoin
Stabilizer: tricalcium citrate acid
Nucleant: an acetal copolymer Example 1

A mid molecular weight polyoxymethylene, Hostaform® HS90 (HF HS90), available from Ticona Engineering Polymers of Florence, Ky. was utilized to form polyoxymethylene compositions as described in the table below. The components as described below were mixed in a Werner Pfleiderer ZSK 32 co-rotating intermeshing twin-screw extruder with a 32 mm diameter. Samples were molded on a Mannesmann Demag D100 NCIII injection molding machine.

| Component | Comp. Sample 1 | Comp. Sample 2 | Inv. Sample 1 |
|---|---|---|---|
| Lubricant | 0.20% | 0.20% | 0.20% |
| Antioxidant | 0.3% | 0.3% | 0.3% |
| Benzoguanamine | — | 0.5% | — |
| Stabilizer | 0.05% | 0.05% | 0.05% |
| Nucleant | 0.50% | 0.50% | 0.50% |
| MTMO | — | — | 0.50% |
| POM | 98.95% | 98.45% | 98.45% |
| FORMULATION % TOTAL | 100.0% | 100.0% | 100.0% |

The compositions and tensile bars formed of the compositions were tested for a variety of physical characteristics. Results are provided in the table below:

| | Comp. Sample 1 | Comp. Sample 2 | Inv. Sample 1 |
|---|---|---|---|
| Melt Index (g/10 min) | 8.03 | 8.20 | 7.94 |
| Tensile Modulus (50 mm/min) (MPa) | 3189 | 3010 | 3081 |
| Tensile Break Stress (50 mm/min) (MPa) | 69.26 | 64.91 | 66.34 |
| Tensile Break Strain (50 mm/min) (%) | 41.08 | 49.30 | 50.20 |
| Yield strain (%) | 13.57 | 13.59 | 13.66 |
| Yield stress (Mpa) | 73.48 | 72.58 | 72.46 |
| Flex Modulus (2 mm/min) (MPa) | 2978.00 | 2797.00 | 2843.00 |
| Flex Stress (2 mm/min) (MPa) @ 3.5% | 80.27 | 74.57 | 76.30 |
| Charpy Notched Impact Strength (kJ/m$^2$) | 7.30 | 7.80 | 6.90 |
| DTUL @1.8 Mpa | 111.30 | 107.30 | 110.50 |
| VDA-275 (ppm) | 3.31 | 2.92 | 0.36 |
| ASTM Yellowness index | −2.67 | −0.53 | −1.11 |
| L | 88.06 | 87.91 | 87.03 |
| a | 0.56 | 0.02 | 0.23 |
| b | −1.28 | −0.15 | −0.25 |

As can be seen, the addition of the benzoguanamine formaldehyde scavenger to the composition is not effective in reducing formaldehyde emission. The addition of the mercapto silane compound, however, is able to reduce formaldehyde emission by 89% as compared to the similar composition that does not include the silane compound.

The percentage of hydrolyzable groups on each sample was determined. Results are shown in FIG. 1.

Figure 2:
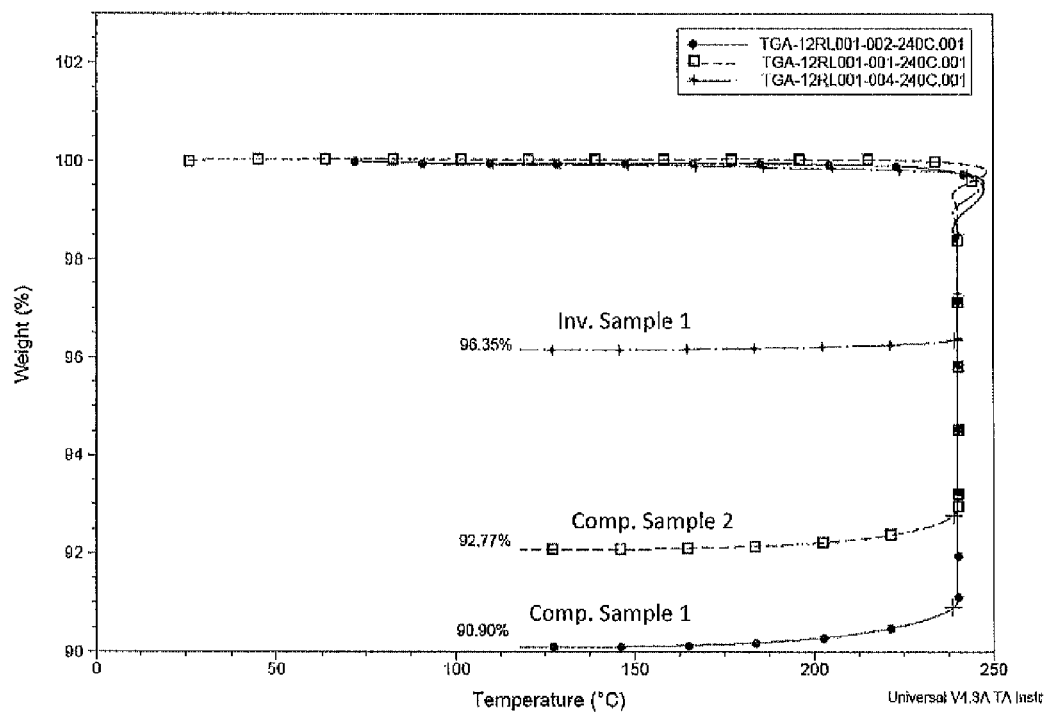
FIG. 2 illustrates the results of a thermogravimetric analysis of the compositions of FIG. 1 at a first set of testing conditions.
Figure 3:
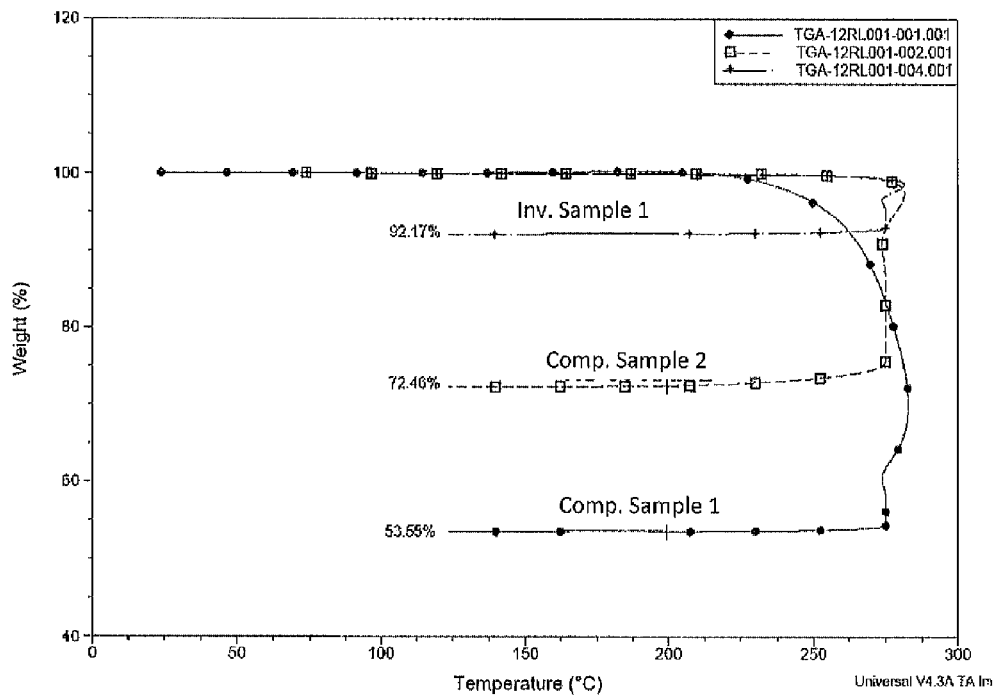
FIG. 3 illustrates the results of a thermogravimetric analysis of the compositions of FIG. 1 at a second set of testing conditions.

Thermogravimetric analysis was also carried out with the three samples at two different test conditions. In the first run, the conditions included a ramp-up of 20° C. per minute to 240° C., followed by isothermal conditions at 240° C. for 60 minutes. Results are shown in FIG. 2. In the second run, the conditions included a ramp-up of 20° C. per minute to 275° C., followed by isothermal conditions at 275° C. for 30 minutes. Results are shown in FIG. 3.

Nuclear magnetic resonance end group analysis was carried out on the samples. Results provided evidence that the mercapto silane compound is capping the polyoxymethylene at the terminal hydroxyl groups. Results are provided in the table below:

| Sample ID | C2 wt % | Formate mol % | OCH$_3$ mmol/kg | C1OH mmol/kg | C2OH mmol/kg |
|---|---|---|---|---|---|
| Comparative Sample 1 | 0.22 | 0.00 | 45.61 | 25.54 | 12.55 |
| Comparative Sample 2 | 0.23 | 0.00 | 46.49 | 29.67 | 10.85 |
| Inventive Sample 1 | 0.20 | 0.00 | 41.86 | 2.21 | 9.01 |

Example 2

A mid molecular weight polyoxymethylene, Celcon® M90 (CN M90) available from Ticona Engineering Polymers of Florence, Ky. was utilized to form polyoxymethylene compositions as described in the table below. The components as described below were mixed in a Werner Pfleiderer ZSK 32 co-rotating intermeshing twin-screw extruder with a 32 mm diameter. Samples were molded on a Mannesmann Demag D100 NCIII injection molding machine

| Component | Comp. Sample 3 | Inv. Sample 2 | Inv. Sample 3 | Inv. Sample 4 | Inv. Sample 5 | Inv. Sample 6 |
|---|---|---|---|---|---|---|
| Lubricant | 0.20% | 0.20% | 0.20% | 0.20% | 0.20% | 0.20% |
| Antioxidant | 0.3% | 0.3% | 0.3% | 0.3% | 0.3% | 0.3% |
| Benzoguanamine | 0.5% | — | — | — | — | — |
| Stabilizer | 0.05% | 0.05% | 0.05% | 0.05% | 0.05% | 0.05% |
| Nucleant | 0.50% | 0.50% | 0.50% | 0.50% | 0.50% | 0.50% |
| ATEO | — | 0.50% | 0.10% | — | — | — |
| MTMO | — | — | — | 0.50% | — | — |
| OTEO | — | — | — | — | 0.50% | 0.10% |
| POM | 98.45% | 98.45% | 98.85% | 98.45% | 98.45% | 98.85% |
| FORMULATION % TOTAL | 100.0% | 100.0% | 100.0% | 100.0% | 100.00% | 100.00% |

The compositions and tensile bars formed of the compositions were tested for a variety of physical characteristics. Results are provided in the below table:

|  | Comp. Sample 3 | Inv. Sample 2 | Inv. Sample 3 | Inv. Sample 4 | Inv. Sample 5 | Inv. Sample 6 |
|---|---|---|---|---|---|---|
| Melt Index (g/10 min) | 9.280 | 9.217 | 9.190 | 9.430 | 9.509 | 9.260 |
| Tensile Modulus (50 mm/min) (MPa) | 2584 | 2718 | 2723 | 2590 | 2694 | 2745 |
| Tensile Break Stress (50 mm/min) (MPa) | 52.40 | 56.91 | 55.22 | 52.14 | 60.62 | 58.58 |
| Tensile Break Strain (50 mm/min) (%) | 34.39 | 30.93 | 30.85 | 34.89 | 27.57 | 36.11 |
| Yield strain (%) | 10.51 | 9.75 | 9.96 | 10.13 | 10.45 | 9.94 |
| Yield stress (MPa) | 64.63 | 65.26 | 65.33 | 63.45 | 63.52 | 64.56 |
| Flex Modulus (2 mm/min) (MPa) | 2363.00 | 2466.00 | 2506.00 | 2383.00 | 2483.00 | 2520.00 |
| Flex Stress (2 mm/min) (MPa) @ 3.5% | 65.25 | 67.78 | 69.45 | 66.41 | 67.91 | 69.41 |
| Charpy Notched Impact Strength (kJ/m$^2$) | 6.90 | 5.60 | 6.20 | 6.70 | 6.00 | 5.60 |
| DTUL @1.8 MPa | 101.10 | 98.30 | 100.60 | 101.20 | 103.20 | 107.10 |
| VDA-275 (ppm) | 1.65 | 1.47 | 4.32 | 0.40 | 1.21 | 1.82 |
| ASTM Yellowness index | −5.52 | −5.53 | −5.64 | −6.34 | 1.23 | 0.64 |
| L | 88.81 | 90.20 | 89.45 | 90.25 | 91.94 | 91.94 |
| a | −0.22 | −0.46 | −0.47 | −0.17 | −0.58 | −0.46 |
| b | 0.70 | 1.07 | 0.90 | −0.11 | 1.16 | 0.87 |

As can be seen, all of the silane compounds were effective in reducing the formaldehyde emission levels, with the mercapto silane compound MTMO providing a 75% lower emission level as compared to the composition that utilized a benzoguanamine scavenger alone.

Figure 4:
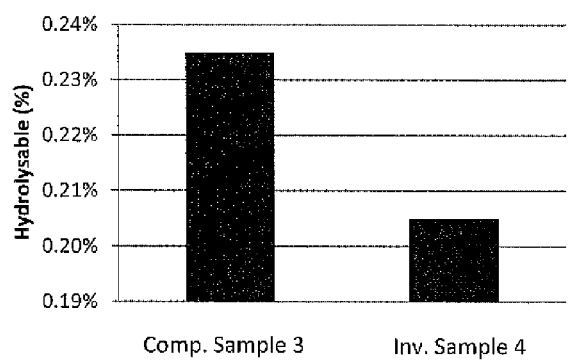
FIG. 4 illustrates a comparison of the hydrolyzable content of a composition including another end-capped polyoxymethylene as described herein, and a comparative composition.

The percentage of hydrolyzable groups for comparative sample 3 and inventive sample 4 were determined, Results are shown in FIG. 4.

Figure 5A:
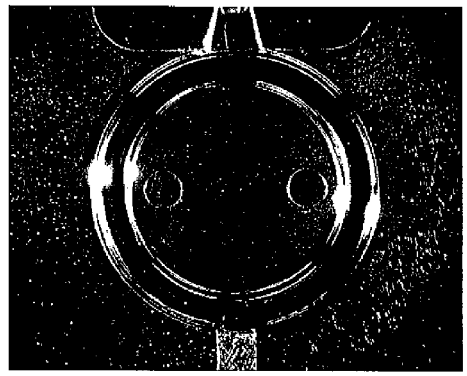
FIG. 5A and FIG. 5B are images of a comparative sample polyoxymethylene composition showing a mold deposit in the ventilation channel.
Figure 5B:
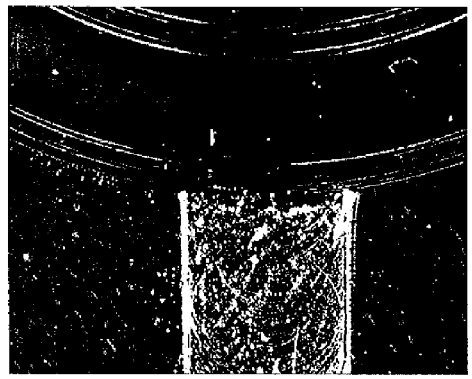
Figure 6A:
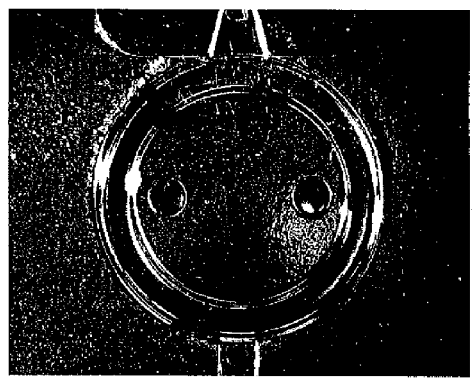
FIG. 6A and FIG. 6B are images of an inventive sample polyoxymethylene composition showing a very thin mold deposit on the ring channel, but it could not be transferred for identification.
Figure 6B:
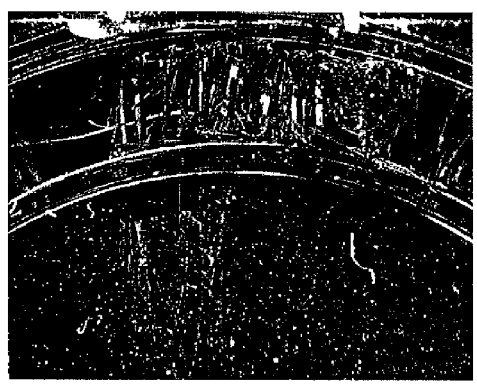
Figure 7A:
FIG. 7A and FIG. 7B are images of an inventive sample polyoxymethylene composition with no mold deposit found on the sample.
Figure 7B:

Photographs of comparative sample 3, inventive sample 4 and inventive sample 5 were taken after scratching (5000 shots) to determine the presence of mold deposits on the samples. Comparative sample 3 is seen in FIGS. 5A and 5B in increasing magnification. No deposit on the mold surface and ring channel was found, with a slight mold deposit seen in the ventilation channel. Inventive sample 4 is seen in FIGS. 6A and 6B in increasing magnification. A very thin mold deposit was seen in the ring channel and on the mold surface, but it could not be transferred to IR for identification. Inventive sample 5 is seen in FIGS. 7A and 7B in increasing magnification. No mold deposit was found on this sample.

Example 3

A high molecular weight polyoxymethylene, Hostaform® HS15 (HF HS15) available from Ticona Engineering Polymers of Florence, Ky. was utilized to form polyoxymethylene compositions as described in the table below. The components as described below were mixed in a Werner Pfleiderer ZSK 32 co-rotating intermeshing twin-screw extruder with a 32 mm diameter. Samples were molded on a Mannesmann Demag D100 NCIII injection molding machine.

| Component | Comp. Sample 4 | Comp. Sample 5 | Inv. Sample 7 |
|---|---|---|---|
| Lubricant | 0.20% | 0.20% | 0.20% |
| Antioxidant | 0.3% | 0.3% | 0.3% |
| Benzoguanamine | — | 0.5% | — |
| Stabilizer | 0.05% | 0.05% | 0.05% |
| Nucleant | 0.50% | 0.50% | 0.50% |
| MTMO | — | — | 0.50% |
| POM | 98.95% | 98.45% | 98.45% |
| FORMULATION % TOTAL | 100.0% | 100.0% | 100.0% |

The compositions and tensile bars formed of the compositions were tested for a variety of physical characteristics. Results are provided in the below table:

|  | Comp. Sample 4 | Comp. Sample 5 | Inv. Sample 7 |
|---|---|---|---|
| Melt index (g/10 min) | 1.410 | 1.330 | 1.38 |
| Tensile Modulus (50 mm/min) (MPa) | 2845 | 2690 | 2737 |
| Tensile Break Stress (50 mm/min) (MPa) | 65.22 | 60.57 | 65.27 |
| Tensile Break Strain (50 mm/min) (%) | 45.17 | 51.42 | 69.13 |
| Yield strain (%) | 24.05 | 22.98 | 22.89 |
| Yield stress (MPa) | 68.88 | 68.43 | 69.91 |
| Flex Modulus (2 mm/mm) (MPa) | 2694.00 | 2579.00 | 2585.00 |
| Flex Stress (2 mm/min) (MPa) @ 3.5% | 73.39 | 70.20 | 69.06 |
| Charpy Notched Impact Strength (kJ/m$^2$) | 9.60 | 11.60 | 10.30 |
| DTUL @1.8 MPa | 96.00 | 97.40 | 101.10 |
| VDA-275 (ppm) | 7.97 | 11.69 | 5.15 |
| ASTM Yellowness index | −4.83 | −4.82 | −0.35 |
| L | 89.88 | 90.11 | 88.37 |
| a | −0.09 | −0.44 | −0.02 |
| b | 0.89 | 1.09 | −0.26 |

As can be seen, the utilization of the benzoguanamine scavenger actually increased the formaldehyde emission levels as compared to comparative sample no. 5, while the addition of the silane compound decreased the formaldehyde emission of the low molecular weight polyoxymethylene by about 35%.

Figure 8:
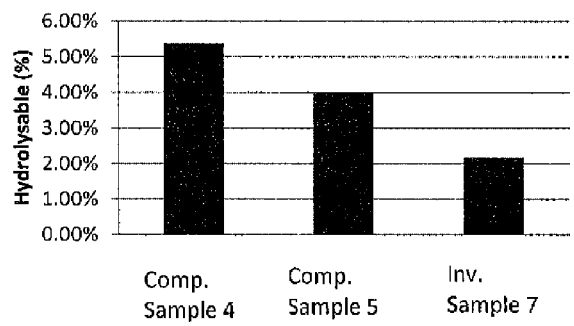
FIG. 8 illustrates a comparison of the hydrolyzable content of a composition including another end-capped polyoxymethylene as described herein, and two comparative compositions.

The percentage of hydrolyzable groups for the samples was determined. Results are shown in FIG. 8.

Example 4

A high molecular weight polyoxymethylene, Celcon® HS15 (CN HS15) available from Ticona Engineering Polymers of Florence, Ky. was utilized to form polyoxymethylene compositions as described in the table below. The components as described below were mixed in a Werner Pfleiderer ZSK 32 co-rotating intermeshing twin-screw extruder with a 32 mm diameter. Samples were molded on a Mannesmann Demag D100 NCIII injection molding machine.

| Component | Comp. Sample 6 | Inv. Sample 8 | Inv. Sample 9 |
|---|---|---|---|
| Lubricant | 0.20% | 0.20% | 0.20% |
| Antioxidant | 0.3% | 0.3% | 0.3% |
| copolyamide | — | 0.05% | — |
| 5-ureidohydantoin | — | — | 0.07% |
| Stabilizer | 0.05% | 0.05% | 0.05% |
| Nucleant | 0.50% | 0.50% | 0.50% |
| MTMO | — | 0.50% | 0.50% |
| POM | 98.95% | 98.35% | 98.33% |
| FORMULATION % TOTAL | 100.0% | 100.0% | 100.0% |

The compositions and tensile bars formed of the compositions were tested for a variety of physical characteristics. Results are provided in the below table:

| | Comp. Sample 6 | Inv. Sample 8 | Inv. Sample 9 |
|---|---|---|---|
| Melt Index (g/10 min) | 1.159 | 0.955 | 1.539 |
| Physical Testing Results | 024-001 | 024-003 | 024-004 |
| ITC - Modulus (50 mm/min) (MPa) | 2864 | 2765 | 2760 |
| ITC - Break Stress (50 mm/min) (MPa) | 70.02 | 67.77 | 65.81 |
| ITC - Break Strain (50 mm/min) (%) | 38.28 | 57.19 | 61.92 |
| Yield strain (%) | 27.29 | 28.05 | 25.07 |
| Yield stress (MPa) | 70.86 | 69.75 | 69.81 |
| IPF - Flex Modulus (2 mm/min) (MPa) | 2832 | 2776 | 2698 |
| IPF - Flex Stress (2 mm/min) (MPa) @ 3.5% | 75.46 | 73.73 | 71.50 |
| Charpy Notched (kJ/m$^2$) | 9.20 | 10.20 | 9.70 |
| VDA-275 (ppm) | 5.46 | 1.03 | 1.06 |
| ASTM Yellowness index | 3.66 | 2.59 | 3.56 |
| L | 91.83 | 92.09 | 91.99 |
| a | −0.15 | −0.36 | −0.55 |
| b | 1.98 | 1.53 | 2.14 |

As can be seen, the combination of the formaldehyde scavenger with the end capping of the polyoxymethylene with the silane compound can be used together to provide a very low formaldehyde emission level for the high molecular weight polyoxymethylene composition.

Example 5

A high molecular weight polyoxymethylene, Celcon® M15HP(CN M15) available from Ticona Engineering Polymers of Florence, Ky. was utilized to form polyoxymethylene compositions as described in the table below. The components as described below were mixed in a Werner Pfleiderer ZSK 32 co-rotating intermeshing twin-screw extruder with a 32 mm diameter. Samples were molded on a Mannesmann Demag D100 NCIII injection molding machine.

| Component | Comp. Sample 7 | Inv. Sample 10 | Inv. Sample 11 |
|---|---|---|---|
| Lubricant | 0.20% | 0.20% | 0.20% |
| Antioxidant | 0.2% | 0.2% | 0.2% |
| copolyamide | — | 0.05% | — |
| 5-ureidohydantoin | 0.07% | — | 0.07% |
| Nucleant | 0.50% | 0.50% | 0.50% |
| MTMO | — | 0.50% | 0.50% |
| POM | 99.03% | 98.35% | 98.33% |
| FORMULATION % TOTAL | 100.0% | 100.0% | 100.0% |

The compositions and tensile bars formed of the compositions were tested for a variety of physical characteristics. Results are provided in the below table:

| | Comp. Sample 7 | Inv. Sample 10 | Inv. Sample 11 |
|---|---|---|---|
| Melt Index (g/10 min) | 1.962 | 1.489 | 1.445 |
| ITC - Modulus (50 mm/min) (MPa) | 2745 | 2664 | 2688 |
| ITC - Break Stress (50 mm/min) (MPa) | 64.59 | 66.19 | 59.70 |
| ITC - Break Strain (50 mm/min) (%) | 49.36 | 39.14 | 65.34 |
| Yield strain (%) | 19.59 | 22.40 | 21.23 |
| Yield stress (Mpa) | 67.66 | 68.09 | 67.79 |
| IPF - Flex Modulus (2 mm/min) (MPa) | 2547.00 | 2617 | 2619 |
| IPF - Flex Stress (2 mm/min) (MPa) @ 3.5% | 69.49 | 70.21 | 69.80 |
| Charpy Notched (kJ/sq_m) | 9.50 | 10.20 | 9.60 |
| VDA-275 (ppm) | 10.11 | 1.15 | 2.57 |
| ASTM Yellowness index | 5.14 | 0.96 | 2.31 |
| L | 90.78 | 93.16 | 92.80 |
| a | −0.49 | −0.45 | −0.58 |
| b | 2.91 | 0.74 | 1.51 |

As can be seen, the combination of the formaldehyde scavenger with the end capping of the polyoxymethylene with the silane compound can be used together to provide a very low formaldehyde emission level for the low molecular weight polyoxymethylene composition.

Example 6

Delrin® 100, a high viscosity polyoxymethylene homopolymer available from DuPont™ and Tenac® 3010, a high viscosity polyoxymethylene homopolymer available from the Asahi Kasei Chemicals Corporation, were processed in conjunction with a silane compound. Specifically, the as-purchased polyoxymethylene was melt processed at either 195° C. or 210°. In one run, the polyoxymethylene was melt processed in conjunction with 0.5 wt % of the mercapto silane compound. The compositions were then examined for determination of formaldehyde emission according to VDE-275. Compositions and results are provided in the table below:

| | Delrin ® | Tenac ® | MTMO | Formulation total | Melt temperature | VDA-275 (ppm) |
|---|---|---|---|---|---|---|
| Comp. sample 8 | 100.0% | — | — | 100.0% | 195° C. | 8.55 |
| Comp. sample 9 | 100.0% | — | — | 100.0% | 195° C. | 5.89 |
| Comp. sample 10 | 100.0% | — | — | 100.0% | 210° C. | 20.34 |
| Comp. sample 11 | 100.0% | — | — | 100.0% | 210° C. | 15.39 |
| Comp. sample 12 | — | 100.0% | — | 100.0% | 195° C. | 2.13 |
| Comp. sample 13 | — | 100.0% | — | 100.0% | 210° C. | 4.80 |
| Inv. Sample 12 | 99.5% | — | 0.5% | 100.0% | 195° C. | 3.05 |
| Inv. Sample 13 | 99.5% | — | 0.5% | 100.0% | 195° C. | 3.03 |
| Inv. Sample 14 | 99.5% | — | 0.5% | 100.0% | 210° C. | 6.92 |
| Inv. Sample 15 | 99.5% | — | 0.5% | 100.0% | 210° C. | 8.32 |
| Inv. Sample 16 | — | 99.5% | 0.5% | 100.0% | 195° C. | 2.67 |
| Inv. Sample 17 | — | 99.5% | 0.5% | 100.0% | 210° C. | 8.60 |

Example 7

Materials

Polyoxymethylene (POM): A POM copolymer having a melt index of 9 (at 190° C./2.16 kg) with either 3.4 wt. % dioxolane or 2 wt. % ethylene glycol as comonomer Silane Compound: (3-mercaptopropyl)trimethoxy silane (MTMO)

Acid Scavenger: Calcium-12 Hydroxystearate

Antioxidant: Ethylene bis(oxyethylene) bis[β3-(3-tert-butyl-4-hydroxy-5-methylphenyl)propionate])

Lubricant: Ethylene bis stearamide wax

Stabilizer: tricalcium citrate

Formaldehyde scavenger: Benzoguanamine (2,4-Diamino-6-phenyl-1,3,5-triazine)

Nucleant: an acetal copolymer

Polymeric compositions were formed as described in the table below. The components were compounded in a Coperion ZSK 25 extruder at 150 rpm, T=190° C., no vacuum. The throughput rate was 15 kg/hr.

| Component | Inv. Sample 18 | Inv. Sample 19 | Inv. Sample 20 | Comp. Sample 14 |
|---|---|---|---|---|
| POM | 98.45 | 98.43 | 98.43 | 98.45 |
| Antioxidant | 0.30 | 0.30 | 0.30 | 0.30 |
| Lubricant | 0.20 | 0.20 | 0.20 | 0.20 |
| Stabilizer | 0.05 | — | — | 0.05 |
| Acid Scavenger | — | 0.07 | 0.07 | — |
| MTMO | 0.50 | 0.50 | 0.50 | — |
| Formaldehyde scavenger | — | — | — | 0.50 |
| Nucleant | 0.50 | 0.50 | 0.50 | 0.50 |

The compositions and tensile bars formed of the compositions were tested for a variety of physical characteristics. The formaldehyde emission levels (VDA 275) were tested at various different melt temperatures (MT) and Gardner Yellow Index were tested at various different melt temperatures, as shown. Results are provided in the below table:

| | Inv. Sample 18 | Inv. Sample 19 | Inv. Sample 20 | Comp. Sample 14 |
|---|---|---|---|---|
| VDA 275 (ppm) MT = 185° C. | 1.6 | 3.7 | 3.7 | 1.0 |
| VDA 275 (ppm) MT = 205° C. | 25 | 4.9 | 3.8 | 3.5 |
| VDA 275 (ppm) MT = 220° C. | 58 | 9.8 | 6.2 | 7.6 |
| DIN Yellowness index (Injection plaque 185° C.) | −7.4 | −6.6 | −5.2 | −7.3 |
| DIN Yellowness index (injection plaque 205° C.) | −6.4 | −3.1 | −0.3 | −6.6 |
| DIN Yellowness index (injection plaque 220° C.) | −7.1 | −1.5 | −1.3 | −6.6 |

Figure 9:
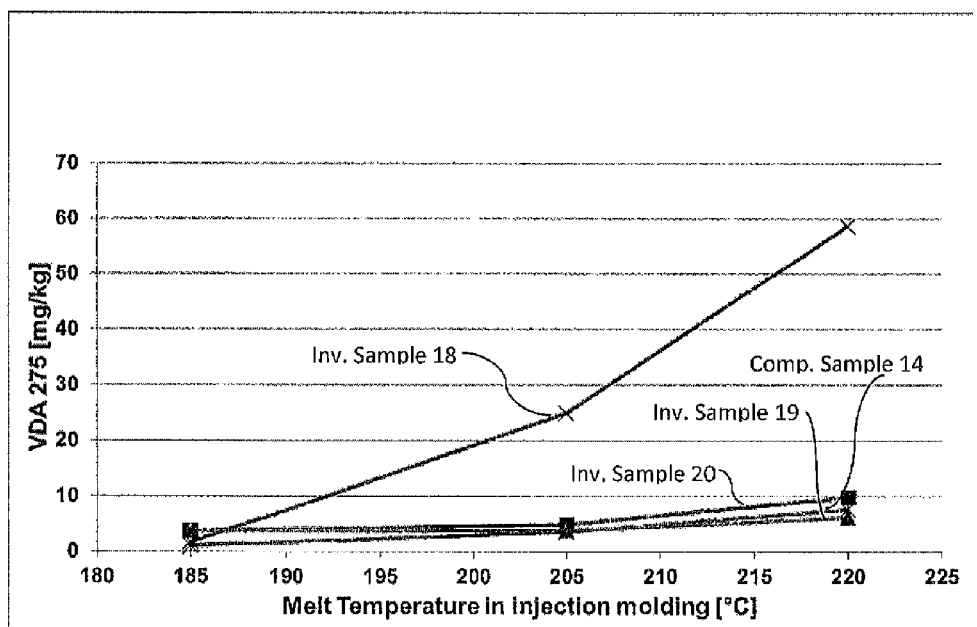
FIG. 9 presents the formaldehyde emission levels with melt temperature for several samples as described herein.
Figure 10:
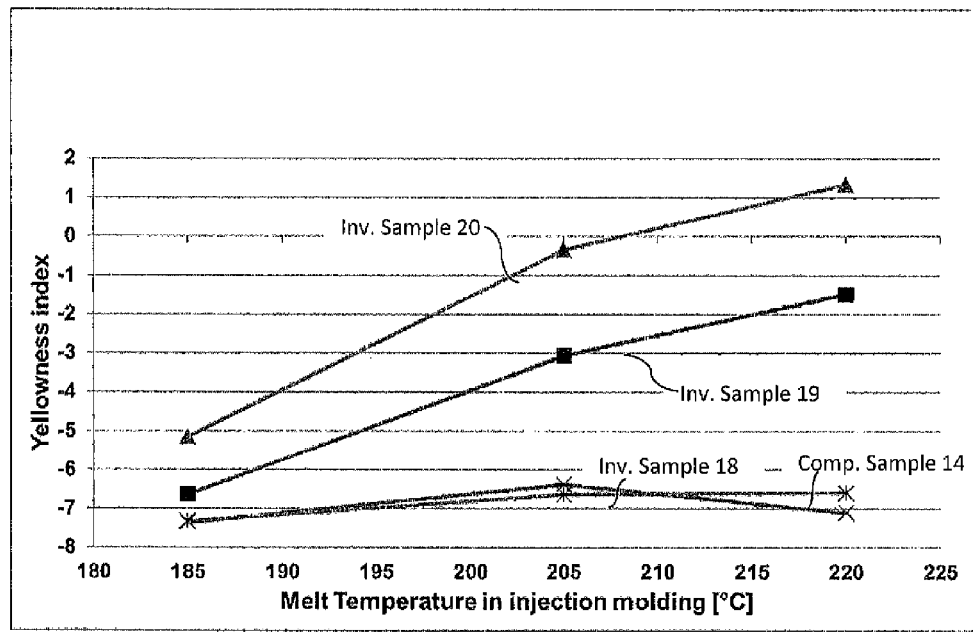
FIG. 10 presents the change in Gardner Yellowness Index with melt temperature for several samples as described herein.

As can be seen, the formaldehyde emission values increased with the melt temperature. In addition, the substitution of tricalcium citrate with the hydroxystearate acid scavenger improved the formaldehyde emission level at higher temperatures. FIG. 9 illustrates the change in formaldehyde emission with temperature for each sample and FIG. 10 illustrates the change in Gardner Yellowness Index with temperature for each sample.

Example 8

Materials

Polyoxymethytene (POM): Polyoxymethylene (POM): A POM copolymer having a melt index of 9 (at 190° C./2.16 kg) with either 3.4 wt. % dioxolane or 2 wt. % ethylene glycol as comonomer Silane Compound: (3-mercaptopropyl)trimethoxy silane (MTMO)

Acid Scavenger: Calcium-12 Hydroxystearate

Antioxidant: Ethylene bis(oxyethylene) bis[β-(3-tert-butyl-4-hydroxy-5-methylphenyl)propionate])

Lubricant:
  a. Ethylene bis stearamide wax
  b. stearyl stearate

Formaldehyde scavenger: Benzoguanamine (2,4-Diamino-6-phenyl-1,3,5-triazine)

Nucleant: an acetal copolymer

Light Stabilizer: N-methylated, oligomeric, high molecular weight hindered amine light stabilizer UV light absorber: 2-(2H-benzzotriazol-2-yl)4,6-bis(1-ethyl-1-phenylethylphenol Filler: calcium carbonate Tribological Property Improver: low density polyethylene graft copolymer Polymeric compositions were formed as described in the table below. The components were compounded in a Coperion ZSK 25 extruder at 150 rpm, T=.190° C., no vacuum. The throughput rate was 15 kg/hr.

| Component | Comp. Sample 15 | Inv. Sample 21 | Comp. Sample 16 | Inv. Sample 22 |
|---|---|---|---|---|
| POM | 80.55 | 80.55 | 80.55 | 80.55 |
| Lubricant a | 0.18 | 0.18 | 0.18 | 0.18 |
| Formaldehyde scavenger | 0.5 | — | 0.5 | — |
| MTMO | — | 0.5 | — | 0.5 |
| Antioxidant | 0.3 | 0.3 | 0.3 | 0.3 |
| Acid Scavenger | 0.07 | 0.07 | 0.07 | 0.07 |
| Light stabilizer | 0.5 | 0.5 | 0.5 | 0.5 |
| UV light absorber | 0.4 | 0.4 | 0.4 | 0.4 |
| Filler | 10 | 10 | 10 | 10 |
| Tribological prop. Imp. | 5 | 5 | 5 | 5 |
| Lubricant b | 2 | 2 | 2 | 2 |
| Nucleant | 0.5 | 0.5 | 0.5 | 0.5 |

The compositions and tensile bars formed of the compositions were tested for a variety of physical characteristics. The formaldehyde emission levels (VDA 275) were tested at various different melt temperatures (MT). Results are provided in the below table:

| | Comp. Sample 15 | Inv. Sample 21 | Comp. Sample 16 | Inv. Sample 22 |
|---|---|---|---|---|
| VDA 275 (ppm) MT = 185° C. | 1.5 | 1.0 | 2.3 | 1.3 |
| VDA 275 (ppm) MT = 205° C. | 2.2 | 0.9 | 4.9 | 1.6 |
| VDA 275 (ppm) MT = 220° C. | 5.9 | 1.3 | 8.8 | 2.2 |
| DIN Yellowness index (injection plaque 205° C.) | 13.7 | 11.4 | 15.5 | 12.7 |

Figure 11:
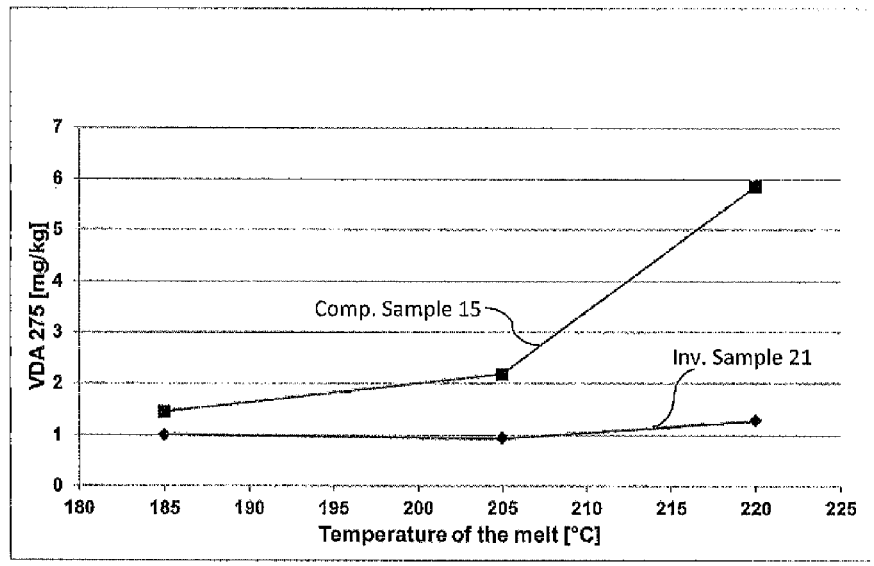
FIG. 11 presents the formaldehyde emission levels with melt temperature for two samples as described herein.
Figure 12:
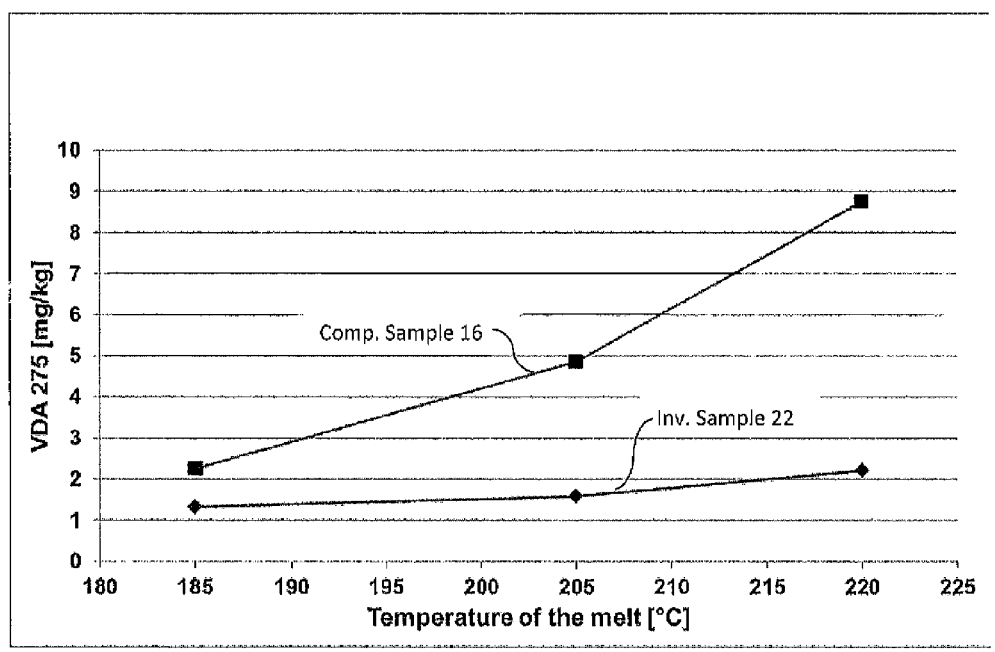
FIG. 12 presents the formaldehyde emission levels with melt temperature for two samples as described herein.

As can be seen, the addition of the acid scavenger to the formulations improved the formaldehyde emission at higher melt temperature in the injection molding. FIG. 11 illustrates the change in formaldehyde emission with temperature for Comparative Sample 15 and Inventive Sample 21 and FIG. 12 illustrates the change in formaldehyde emission with temperature for Comparative Sample 16 and Inventive Sample 22. It may be noted that the composition of Inventive Sample 21 and Inventive Sample 22 are the same, the differences in tested characteristics are understood to be merely expected variations in experimental results.

While certain representative embodiments and details have been shown for the purpose of illustrating the subject invention, it will be apparent to those skilled in this art that various changes and modifications may be made therein without departing from the scope of the disclosure.

What is claimed is:

1. An end-capped polyoxymethylene, the end-capped polyoxymethylene comprising an inorganic linkage to a non-hydrolyzable organic group, the non-hydrolyzable organic group being at the terminus of the end-capped polyoxymethylene, the end-capped polyoxymethylene being the reaction product of a hydrolyzable group of an end capping compound and a terminal hydroxy group of a polyoxymethylene homopolymer or copolymer, the end capping compound having the general structure of:

$(R_6)_q AX_{(4-q)}$ wherein

A is an inorganic atom that forms the inorganic linkage, q is 1 to 3,

X is the hydrolyzable group, and $R_6$ is the nonhydrolyzable organic group.

2. The end-capped polyoxymethylene according to claim 1, wherein the inorganic linkage is a siloxane linkage.

3. The end-capped polyoxymethylene according to claim 1, wherein the copolymer includes less than about 1% by weight of the copolymer monomer units having at least two adjacent carbon atoms.

4. The end-capped polyoxymethylene according to claim 1, wherein the nonhydrolyzable organic group comprises a non-reactive terminus or comprises reactive functionality at the terminus.

5. The end-capped polyoxymethylene according to claim 4, wherein the nonhydrolyzable organic group comprises reactive functionality at the terminus selected from halogen, vinyl, epoxy, amino, mercapto, or combinations thereof.

6. The end-capped polyoxymethylene according to claim 1, wherein the polyoxymethylene comprises less than about 2% low molecular weight constituents, 7. The end-capped polyoxymethylene according to claim 1, the end-capped polyoxymethylene having a melt flow index of greater than about 5 grams per 10 minutes and a comonomer content of less than about 1% by weight of monomer units having two or more adjacent carbon atoms, the polyoxymethylene having a hydrolyzable content of less than about 0.9 weight percent.

8. The end-capped polyoxymethylene according to claim 1, the end-capped polyoxymethylene having a melt flow index of greater than about 5 grams per 10 minutes and a comonomer content of greater than about 1% by weight of monomer units having two or more adjacent carbon atoms, the end-capped polyoxymethylene having a hydrolyzable content of less than about 0.23 weight percent.

9. The end-capped polyoxymethylene according to claim 1, the end-capped polyoxymethylene having a melt flow index of greater than about 5 grams per 10 minutes, the end-capped polyoxymethylene having a hydrolyzable content of less than about 3mmol/kg.

10. The end-capped polyoxymethylene according to claim 1, the end-capped polyoxymethylene having a melt flow index of less than about 5 grams per 10 minutes and a hydrolyzable content of less than about 5 weight percent or less than about 5 mmol/kg.

11. A polymeric composition comprising the end-capped polyoxymethylene according to claim 1.

12. The polymeric composition according to claim 11, wherein the end-capped polyoxymethylene has a melt flow index of greater than about 5 grams per 10 minutes, the polymeric composition exhibiting a formaldehyde emission level of less than about 3 ppm as determined according to VDA-275.

13. The polymeric composition according to claim 11, wherein the polyoxymethylene has a melt flow index of less than about 5 grams per 10 minutes, the polymeric composition exhibiting a formaldehyde emission level of less than about 7.5 ppm as determined according to VDA-275.

14. The polymeric composition according to claim 11, the polymeric composition further comprising a formaldehyde scavenger, the polymeric composition exhibiting a formaldehyde emission level of less than about 3 ppm as determined according to VDA-275.

15. The polymeric composition according to claim 11, the polymeric composition further comprising an acid scavenger.

16. The polymeric composition according to claim 15, wherein the acid scavenger is a hydroxide, inorganic acid salt, phosphate, hydrogen phosphate, or carboxylic acid salts of alkali metals or alkaline earth metals.

17. A shaped article comprising the polymeric composition according to claim 11.

18. The shaped article according to claim 17, wherein the shaped article is a mechanical gear, a sliding or guiding element, a housing part, a spring, a chain, a screw, a nut, a fan wheel, a pump part, a valve body, a lock, a handle, a hinge, or a zipper.

19. The shaped article according to claim 18, wherein the shaped article is a component of an electronic device, a medical device, a sporting good, an automotive component, or a household appliance.

20. The shaped article according to claim 19, wherein the automotive component is a fuel system component, a lighting or signaling component, or a window or door lock system component.

21. A method for reducing volatile organic compound emissions from a polymeric composition, the method comprising combining a polyoxymethylene with an end-capping compound, wherein the polyoxymethylene and the end-capping compound are combined in a melt, the end-capping compound having the following structure:

$(R_6)_q AX_{(4-q)}$ wherein
  A is an inorganic atom,
  q is 1 to 3,
  X is a hydrolyzable group, and
  $R_6$ is a nonhydrolyzable organic group the polyoxymethylene comprising a terminal hydroxyl group, the hydrolyzable group of the end-capping compound reacting with a terminal hydroxyl group of the polyoxymethylene to form an end-capped polyoxymethylene, the end capped polyoxymethylene including the inorganic atom as an inorganic linkage in the polymer chain.

22. The method according to claim 21, wherein the end-capping compound is a silane compound.

23. The method according to claim 21, wherein the end-capping compound is provided in an amount of less than about 5 wt. % by weight of the polyoxymethylene.

24. The method according to claim 21, further comprising combining an additive with the end-capped polyoxymethylene.

25. The method according to claim 24, wherein the additive is an acid scavenger.

26. The method according to claim 21, further comprising shaping the polymeric composition comprising the end-capped polyoxymethylene to form a product.

* * * * *

UNITED STATES PATENT AND TRADEMARK OFFICE
CERTIFICATE OF CORRECTION

PATENT NO. : 8,816,015 B2  Page 1 of 1
APPLICATION NO. : 13/832502
DATED : August 26, 2014
INVENTOR(S) : Rong Luo et al.

It is certified that error appears in the above-identified patent and that said Letters Patent is hereby corrected as shown below:

Please correct on the title page of the patent, Item (72) add missing inventor Ursula Ziegler - the listing of Inventors:

Delete "Inventors: Rong Luo, Florence, KY (US); Xinyu Zhao, Cincinnati, OH (US); Robert Gronner, Earlanger, KY (US); Nicolai Papke, Mainz-Kastel (DE)"

And insert -- Inventors: Rong Luo, Florence, KY (US); Xinyu Zhao, Cincinnati, OH (US); Robert Gronner, Earlanger, KY (US); Nicolai Papke, Mainz-Kastel (DE); Ursula Ziegler, Mainz-Kastel (DE) --

Signed and Sealed this
Fourth Day of August, 2015

Michelle K. Lee
*Director of the United States Patent and Trademark Office*

UNITED STATES PATENT AND TRADEMARK OFFICE
CERTIFICATE OF CORRECTION

PATENT NO. : 8,816,015 B2
APPLICATION NO. : 13/832502
DATED : August 26, 2014
INVENTOR(S) : Rong Luo et al.

Page 1 of 1

It is certified that error appears in the above-identified patent and that said Letters Patent is hereby corrected as shown below:

In The Specification

Column 26, line 17 "constituents," please remove the "," after "constituents," and replace with a "." to read --"constituents."--

Signed and Sealed this
Twenty-seventh Day of October, 2015

Michelle K. Lee
*Director of the United States Patent and Trademark Office*